United States Patent [19]
Saito et al.

[11] Patent Number: 6,017,130
[45] Date of Patent: Jan. 25, 2000

[54] LINE ILLUMINATION DEVICE

[75] Inventors: Tomihisa Saito; Takashi Kishimoto; Haruo Matsumoto, all of Osaka, Japan

[73] Assignee: Nippon Sheet Glass Co., Ltd., Osaka, Japan

[21] Appl. No.: 08/920,193

[22] Filed: Aug. 25, 1997

[30] Foreign Application Priority Data

Aug. 30, 1996 [JP] Japan ..................................... 8-229870
Apr. 23, 1997 [JP] Japan ..................................... 9-106129

[51] Int. Cl.[7] ........................................................ F21S 3/00
[52] U.S. Cl. ............................................. 362/223; 362/255
[58] Field of Search ..................................... 362/223, 255

[56] References Cited

U.S. PATENT DOCUMENTS 4,186,431  1/1980  Fingel et al. ............................. 362/223

FOREIGN PATENT DOCUMENTS 6-148435  5/1994  Japan .
7-14414   1/1995  Japan .
8-163320  6/1996  Japan .
8-172512  7/1996  Japan .

*Primary Examiner*—Harold I. Pitts
*Attorney, Agent, or Firm*—Merchant, Gould, Smith, Edell, Welter & Schmidt, P.A.

[57] ABSTRACT

In a line illumination device, a light source is provided at one end of a rod-like transparent light guiding member, for maintaining high and uniform illuminance, and the shape of a light scattering pattern 11 has: a first portion 11a gradually increasing in area from one end to the other end thereof; a second portion 11b continuous with the first portion 11a and increasing in area in the direction towards the other end at a higher rate than that of the first portion; and a third portion 11c continuous with the second portion 11b and extending towards the other end at a maximum width of the second portion 11b.

8 Claims, 11 Drawing Sheets

LINE ILLUMINATION DEVICE

BACKGROUND OF THE INVENTION

1. Field of the Invention

The present invention relates to a line illumination device which is installed in an image reading apparatus, including a facsimile machine, a copy machine and a hand scanner etc.

2. Description of the Related Art

In apparatuses such as facsimile machines, copy machines and hand scanners, etc., an image reading apparatus such as an image scanner has been adopted as a device for reading images such as text. For the types of such image sensors, there are various types, for example: a reducing type, a close contacting type, a completely close contacting type, and so on. Among of those, the image sensor of the close contacting type is constructed with an illumination device, an equimultiple image forming optical device and a sensor, and so on. And, the close contacting type image sensor, having a short optical path thereby contributing to the small size of the apparatus, generally, necessitates no troublesome optical adjustment to be installed into the apparatus, in comparison with the image sensor of such the reducing type. Therefore, it recently has been widely used in place of the reducing type of image sensor for the advantages mentioned above.

The illumination device for use in the close contacting type image sensor must irradiate light onto the surface of the text much more than the illumination that is sufficient for the sensor to perform a read or scan operation. And the area, on which the illumination device illuminates, is line-like, and is relatively long in a main scanning direction (a longitudinal direction), while it may be very narrow in a sub-scanning direction which is perpendicular to the main scanning direction. For instance, the device used in a facsimile machine of a so-called A4 size necessitates a length of 216 mm in the longitudinal direction. And, if the illuminance on the text surface fluctuates in the longitudinal direction, this results in an error in the reading operation of the apparatus. Therefore, it is preferable for the illuminance to be uniform as far as it is possible.

For such an illumination device, an LED type illumination device has been conventionally known, in which a few tens (for example, 30) of LEDs (Light Emitting Diodes) are aligned in a line on a printed wiring board and installed by wire bonding or soldering thereon. In the close contacting type image sensor comprising such an illumination device, light is emitted from the illumination device and is irradiated onto the text surface to be read through a cover glass on which the text is mounted or laid, and an image on the text surface is read by a photoelectric conversion element through a rod lens array.

For such a conventional device or apparatus in which many LEDs are aligned, however, only a portion of the light radiating onto a fine line on the text to be read is actually effective for the reading and the remaining portion thereof is not, i.e., is only wasted. Additionally, there is also known a method, in which the illumination device is positioned as near as possible to the text to be read so as to increase the illuminance, therefore decreasing the number of LEDs that must be installed or provided. However, a greatly fluctuating illuminance results with this method. Namely, with such a construction of the light source or illumination device, there is basically caused a fluctuation in the quantity of light, depending on the pitch of the installed LEDs, more or less. Further, there is also caused a fluctuation in the quantity of light due to differences in characteristics amongst the aligned LEDs themselves, the differences being caused in the production process thereof. Consequently, the fewer LEDs which are installed in one illustration device, the greater the fluctuation in the quantity of light or in the illuminance on the reading line on the text to be read.

Therefore, the same inventors of the present invention have proposed a technology, in Japanese Laid-Open Patent No. 6-148435 (1994) and Japanese Laid-Open Patent No. 7-14414 (1995), in which light emitting elements (LEDs) are provided at both ends of a rod-like transparent member, or a light scattering surface is made on a portion of the surface of the transparent member.

However, with the line illumination device disclosed in the references mentioned above, since the light emitting elements are provided at both end portions of the rod-like transparent member, it is therefore possible to remove one of them. Next, the same inventors of the present invention have also proposed a line illumination device, in Japanese Laid-Open Patent No. 8-163320 (1996) and Japanese Laid-Open Patent No. 8-172512 (1996), in which the light emitting element is provided only at one end of the rod-like transparent member. With the line illumination device disclosed in these official publications, as well as achieving a decrease in the cost thereof by positioning the light emitting element only at one end of the rod-like transparent member, a light scattering pattern is formed on a surface of the rod-like transparent member in such a shape that it gradually increases in area from the one end on which the light is introduced from the light emitting element up to or towards the other end, thereby obtaining a uniform illuminance along the longitudinal direction thereof.

As described in the above, in the line illumination device in which the light emitting element is provided only at the one end portion of the rod-like transparent member, mirror surfaces are made not only at the one end surface of the rod-like transparent member, but also at the other end surface thereof. On the other end surface, which is further provided with a material having a high reflection factor on the outer side of the mirror surface of the other end surface, incident light, which is introduced at the one end portion of the rod-like transparent member and which reaches to the other end surface without being scattered by the scattering pattern, is reflected thereon and turns back to the other end side passing within the rod-like transparent member. And, by repeating this process many times, all the incident light can be utilized as irradiating light from the light scattering pattern.

It can be made by a mold injection if it has the mirror surface at the one end surface thereof. However, if it has mirror surfaces at both ends, a polishing process must be made after a cutting process is performed at the other end portion (a gate portion) by a jig such as a nipper and so on, thereby causing an increase in the number of production steps and in production costs thereof.

SUMMARY OF THE INVENTION

Accordingly, the object of the present invention is to provide a line illumination device at a low cost that is able to maintain uniformity in the illuminance in the longitudinal direction, even if a light source is positioned at only one end side thereof.

In a line illumination device, first, in accordance with the present invention, a rod-like transparent light guiding member is provided with a light source at one end thereof and has another end thereof provided with a roughened surface. With the conventional line illumination device, in which the light source is positioned at one end of the rod-like transparent light guiding member, as explained in the above, the light emitted from the light source is reflected towards the one end side by making the other end surface a mirror surface, and this reflection process is repeated so as to completely consume or utilize the incident light in the transparent light guiding member. However, according to the present invention, since the other end surface remains as a roughened surface, the light being reflected from the roughened surface and directed to the one end decreases in quantity thereof. Therefore, a widest width portion (a third portion) is provided in a light scattering pattern which is near to the other end, thereby utilizing almost all of the incident light from the one end surface before it reaches the other end surface.

Here, in the above-mentioned line illumination device according to the present invention, it is preferable that 100 A/L is equal to or greater than 1.77, and is equal to or less than 10.0 ($1.77 \leq 100$ A/L $\leq 10.0$), where "L" is the whole length of the light scattering pattern and "A" is the length of the third portion.

This is because, if 1.77>100 A/L, the incident light cannot be utilized until it reaches the other end in a sufficient amount thereof, thereby increasing the illuminance at the other end sharply. Otherwise, if 100 A/L>10.0, the incident light increases sharply in quantity at a portion just entering the third portion and it decreases sharply towards the other end.

And, according to the present invention, the rod-like transparent light guiding member has a polygonal cross section and a chamfer portion which is formed in the longitudinal direction thereof as a light emitting surface at one corner thereof, and for the purpose of magnifying the illuminance, a light scattering pattern is formed on a surface opposite to the light emitting surface and intersecting with a line normal to the light emitting surface.

Further, according to the present invention, under condition that the illuminance radiates in the longitudinal direction of the line illumination device in which the light source is positioned at the one end, and that almost of the incident light is consumed before it reaches the other end surface, a first portion generated from the one end side of the light scattering pattern is formed in such a shape that it gradually (including discontinuously) increases in area towards the other end. And, as the first portion gradually increases in area towards the other end, a center line of the light scattering pattern is deviated, and one side edge portion of the pattern cannot be extended beyond side's edge. Therefore, assuming an imaginary extending portion, the area necessary for the pattern is maintained by adding that portion to a side edge portion of the pattern on an opposite side thereof. This portion is a second portion of the light scattering pattern.

Moreover, it is preferable to form a layer of air between the light emitting element of the light source unit and the one end surface opposite to it of the rod-like transparent light guiding member.

Namely, the light emitting element is conventionally connected to the one end of the transparent light guiding member by a transparent adhesive which is adjusted with respect to its refractive index. However, because the angle of divergence of the light incident into the transparent light guiding member can be suppressed by interposing the air layer, the light incident into the transparent light guiding member can be utilized without wasting any thereof.

Further, for the first portion of the above-mentioned light scattering pattern, a pattern is conceivable which is formed with a plurality of discontinuous light scattering portions at least in the vicinity of the light source unit. Namely, the first portion is a region in which the amount of the reflection is smaller, and therefore, it can be made in the form of a so-called zebra pattern of discontinuous plural light scattering patterns. The zebra pattern can be much more easily formed than that of drawing an extremely fine and gradually expanding line pattern.

And, in the portion which is very close to the one end of the light guiding member opposite to the light source unit, a rather uniform illuminance as a whole can be obtained if reflection does not occur. Accordingly, there can be provided a region in which no light scattering pattern exists, in a portion starting from that one end to a position where the first portion of the light scattering pattern starts.

Regarding the color of the interior surface of a case (to be described later), it is preferable for it to be an achromatic color, particularly white, for maintaining uniformity without causing a decrease in the illuminance.

Furthermore, ordinarily, the line illumination device is used under the condition that the rod-like transparent light guiding member is received in the case, but if the position of the rod-like transparent light guiding member is shifted within the case, the uniformity of the illuminance will be lost. In that case, fixing by use of an adhesive of a resin can be considered, but this is disadvantageous with respect to a production process therefor and has a drawback that the light is absorbed in a portion of the resin. Therefore, a convexoconcave engagement is preferable for fixing the rod-like transparent light guiding member to the case.

DESCRIPTION OF THE PREFERRED EMBODIMENTS

Figure 1:
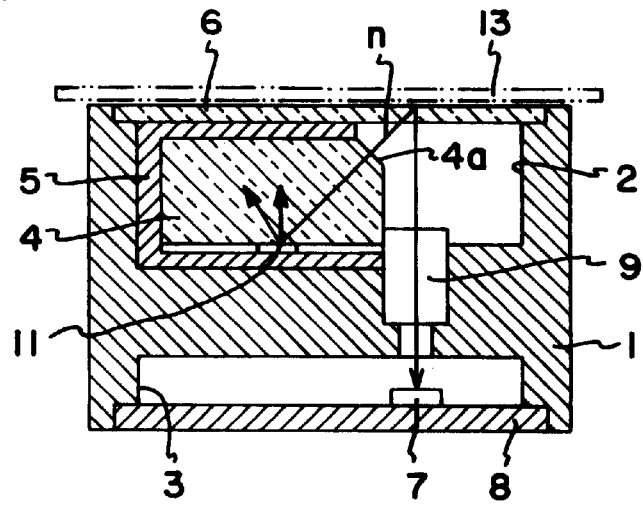
FIG. 1 shows a cross-sectional view cut in the direction perpendicular to a scanning direction in a line illumination device according to the present invention.

Hereinafter, detailed explanation of the embodiments according to the present invention and comparisons thereto will be given by referring to the attached drawings. Here, FIG. 1 shows a cross-sectional view in a direction perpendicular to a scanning direction of the line illumination device according to the present invention, FIG. 2 a perspective view of a case in which a rod-like transparent light guiding member is received, and FIG. 3 an enlarged view of one end portion of the rod-like transparent light guiding member and a light source unit.

In the line illumination device, on a frame 1 are formed concave portions 2 and 3, and in the concave portion 2 is positioned a case 5 which receives a rod-like transparent light guiding member 4 therein. A glass plate 6 covers the opening portion of the concave portion 2. In the concave portion 3, there is attached a substrate provided with a sensor 7 thereon, and a rod lens array 9 is also maintained therein.

Accordingly, light from a light emitting unit 10 which is attached at one end of the case 5 enters into the rod-like transparent light guiding member 4, and it is emitted from the rod-like transparent light guiding member 4 being scattered by a light scattering pattern 11 formed on one side surface of the rod-like transparent light guiding member 4. The emitted light is irradiated onto text 13, and light reflected from the text 13 is detected by the sensor 7 through the rod lens array 9, thereby an image of the text being read.

Here, as a material of the above-mentioned rod-like transparent light guiding member 4, it is preferable to use a resin of high optical transparency, such as an acrylic resin or polycarbonate, or an optical glass of high optical transparency.

As a shape of the cross-section of the rod-like transparent light guiding member 4, it is preferable to be a pentagonal shape, in which a chamfer portion 4a is formed at one corner of a rectangle as a light emitting surface. However, a hexagonal shape is also possible, in which a pair of two opposing corners are cut on a rectangle. Other than these, there is conceivable a hexagonal which is obtained by cutting an arbitrary pair of corners of the rectangle. And, as a shape of the rod-like transparent light guiding member 4, a heptagonal obtained by cutting three arbitrary corners of the rectangular or an octagonal obtained by cutting all four corners are possible, in so far as the two pairs of side surfaces opposing each other of the original square pillar remain.

For the case 5 which receives the rod-like transparent light guiding member 4, it preferably has a high index of optical reflection, and comprises, for instance, a resin which is colored white by blending or combining a white coloring agent of high reflection index, or a material on the surface of which is painted a white paint may be used. Of course, the color should not be restricted only to white, and various colors can be selected depending on the wavelength of the light which is used in the apparatus. Further, a metal plate which inherently embodies a high reflection index, such as an aluminum plate or a stainless plate, also can be used as the material, and it can be finished with a mirror surface.

With such a construction, the light reflected by the interior surface of the case 5 enters again into the transparent light guiding member 4, and transmits within the transparent light guiding member 4. As explained above, the transparent light guiding member 4 is covered with the high reflection index material (as high as possible), thus resulting in an illumination device of higher efficiency.

Figure 3:
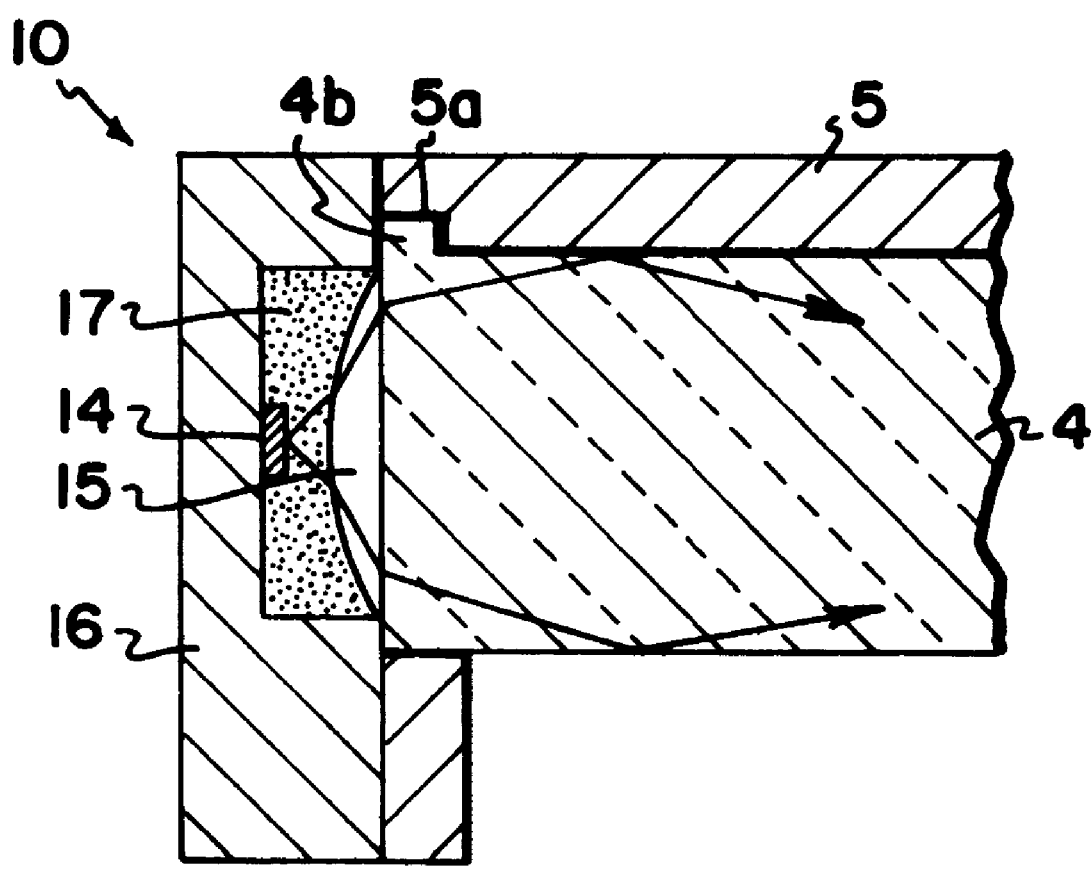
FIG. 3 shows an enlarged view of portions of an end portion of the rod-like transparent light guiding member and a light source unit.

And, as shown in FIG. 3, at one end of the transparent light guiding member 4 at the side of the light emitting unit 10, a projection or a convex 4b is formed, while a recess or a concave 5a is formed on the case 5 for engaging with the transparent light guiding member 4. In this way, when the transparent light guiding member 4 is received in the case 5, an air layer 15 defined between the light emitting unit 10 and the one end surface of the transparent light guiding member 4 is constant in the width thereof, by positioning the end of the light emitting unit 10 accurately.

A light emitting element (an LED chip) 14 is mounted on a printed wiring board 16 by wire bonding, and is further protected by a transparent epoxy resin covering thereon.

And, the light emitted from the light emitting element 14 enters into the rod-like transparent light guiding member 4 from the one end thereof, and if the incident angle of the light is too wide, a part of the light goes out of the rod-like transparent light guiding member 4. Therefore, with the provision of the above-mentioned air layer 15, the incident angle of the light directing to the one end of the rod-like transparent light guiding member 4 is limited or suppressed so as to increase the irradiation efficiency.

Figure 2:
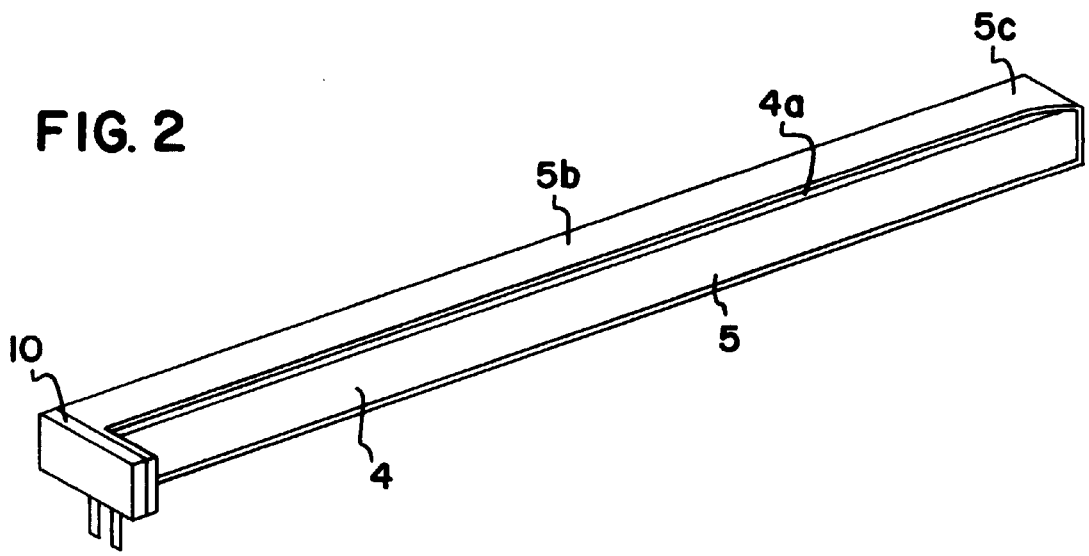
FIG. 2 shows a perspective view of a case receiving a rod-like transparent light guiding member therein.

Also, as shown in FIG. 2, an upper edge portion 5b of the case 5 facing the chamfer portion 4a of the rod-like transparent light guiding member 4 is withdrawn in comparison to a lower edge portion thereof for prohibiting any disturbance in the emission of the light. However, the upper edge portion 5c in the vicinity of the other end portion opposite to the light source unit 10 is extended to the chamfer portion 4a, thereby preventing the generation of noise light.

Figure 4:
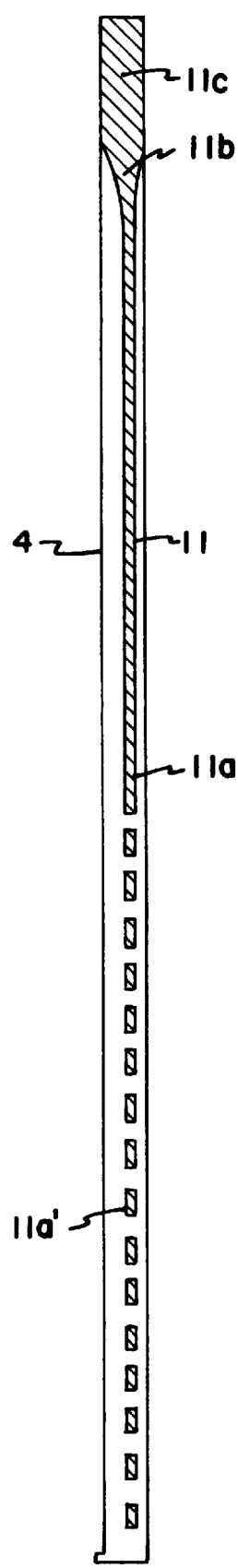
FIG. 4 shows a plane on which a light scattering pattern is formed on the rod-like transparent light guiding member.
Figure 5:
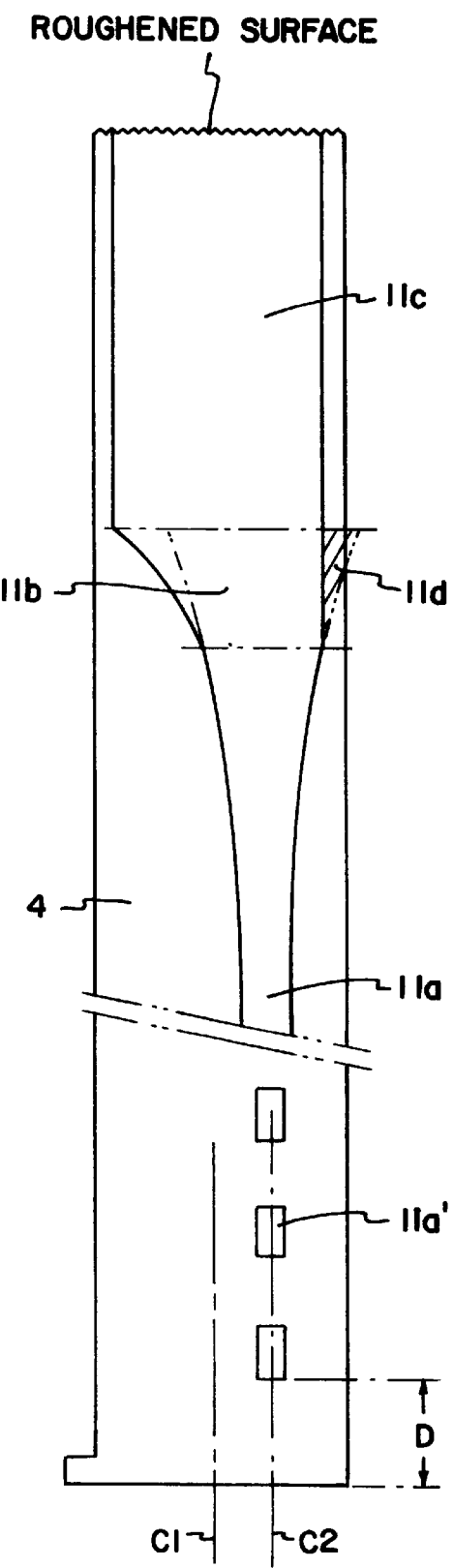
FIG. 5 shows an enlarged view showing the gist of the light scattering pattern.

Next, the light scattering pattern 11 which is formed on a side surface of the rod-like transparent light guiding member 4 will be explained by referring to FIGS. 4 and 5. Here, FIG. 4 shows a surface on which the light scattering pattern of the rod-like transparent light guiding member is formed, and FIG. 5 shows an enlarged view showing the gist of the light scattering pattern.

The light scattering pattern 11 is formed by painting with a white paint. However, the color should not be limited only to white, and various colors can be used depending on the wave length of the light which is used. For instance, light having a wavelength of 570 nm is used in many of the facsimile machines, so then a color of the same wavelength can be used for the facsimile machine to which the present invention is applied. Further, the light scattering pattern can be formed not only by painting, but also by adhering a film of a predetermined color and shape.

The shape of the light scattering pattern 11 has a first portion 11a; the area of which gradually increases from the one end at which the light source unit 10 is positioned, towards the other end; a second portion 11b, which is continuous with the first portion and also increases in area gradually in the direction towards the other end at a higher rate than that of the first portion; and, a third portion 11c, which is continuous with the second portion and extends towards the other end at the maximum width of the second portion.

The first portion 11a is biased with a center line C2 thereof towards the side of chamfer portion 4a rather than towards the center line C1 of the rod-like transparent light guiding member 4. With such a construction, the light scattering pattern 11 is positioned on a line normal to the chamfer portion 4a (a light emitting surface), thereby making it possible to increase the illuminance of the light emitted from the chamfer portion 4a.

The first portion 11a increases in area gradually, depending on the distance from the end portion abutting the light source unit 10. The ratio of the increase in area is so determined that the condition is satisfied that a uniform illuminance in the longitudinal direction is obtained, as well as almost all of the incident light is scattered and emitted from the chamfer portion 4a before it reaches the other end.

In the present embodiment, the first portion 11a is not formed like a continuous belt, but is formed in a plurality of discontinuous block-like light scattering portions 11a' in the vicinity of the light source unit 10. Further, a region D on which no light scattering pattern exists is provided, starting from the one end opposing the light source unit 10 to a position at which the first block-like light scattering portion 11a' of the first portion 11a starts.

As in the above, since the first portion 11a increases in area gradually and with the center line C2 being eccentric, it becomes impossible to expand the side edge portions of the first portion 11a beyond that side's edge. Therefore, assuming an imaginary extending portion as shown in FIG. 5, the area necessary for the pattern is maintained by adding the portion 11d to a side edge portion of the pattern on an opposite side thereof. This portion is the second portion 11b of the light scattering pattern.

The second portion 11b, since the imaginary or virtual extending portion 11d is added to it, is expanded in area sharply towards the other end of the rod-like transparent light guiding member 4, and reaches a printable maximum width. Also, a third portion 11c is formed towards the other end of the rod-like transparent light guiding member 4 at the maximum width (see FIG. 5).

Figure 6:
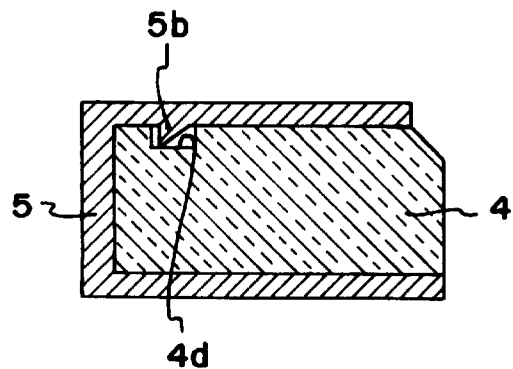
FIG. 6 shows a cross-sectional view of the light guiding member and the case according to another embodiment of the present invention.

FIG. 6 shows the cross-section of the light guiding member and the situation according to the second embodiment of the present invention, in which a recess or concave portion 4d is formed in a part of the light guiding member 4 and a projecting or convex portion 5d is formed on an interior surface of the case 5 for engaging with the concave portion 4d, thereby preventing a portion of the light guiding member 4 from extending outside of the case 5 without necessitating the use of an adhesive.

Next, experimental results concerning the relative illuminance along the whole length of the light scattering pattern, which is obtained by changing the length of the third portion of the light scattering pattern, will be explained by referring to Embodiments 1 through 4 as experimental examples, and Comparison Examples 1 and 2, described below.

Embodiment 1

Conditions are as follows:

Whole length of the light scattering pattern: 226.5 mm;

Width of the third portion of the light scattering pattern: 5 mm;

Length of the third portion of the light scattering pattern: 16.5 mm; and

Illuminance power of incident light: 650 µW.

Evaluation

Figure 7:
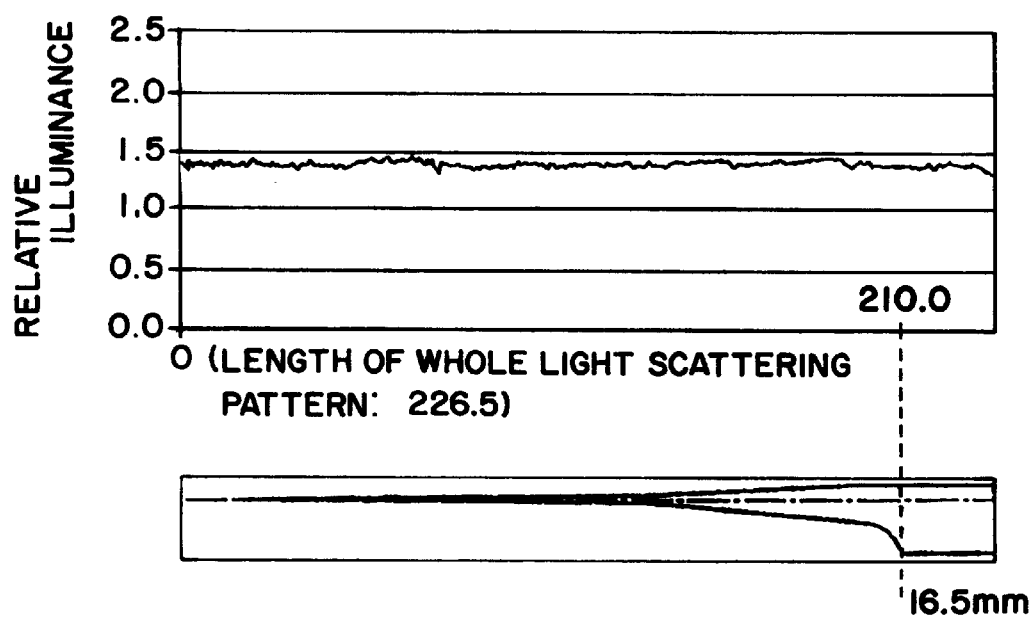
FIG. 7 shows a graph for showing a relationship between an illuminance of the light scattering pattern and a length of a third portion of the pattern in Embodiment 1.

In the case where the length of the third portion is 16.5 mm, as shown in FIG. 7, it is apparent that a uniform illuminance bridging over the one end portion of the rod-like transparent light guiding member and the other end portion thereof can be obtained.

Embodiment 2

Conditions are as follows:

Whole length of the light scattering pattern: 226.5 mm;

Width of the third portion of the light scattering pattern: 5 mm;

Length of the third portion of the light scattering pattern: 8.25 mm; and

Illuminance power of incident light: 650 µW.

Evaluation

Figure 8:
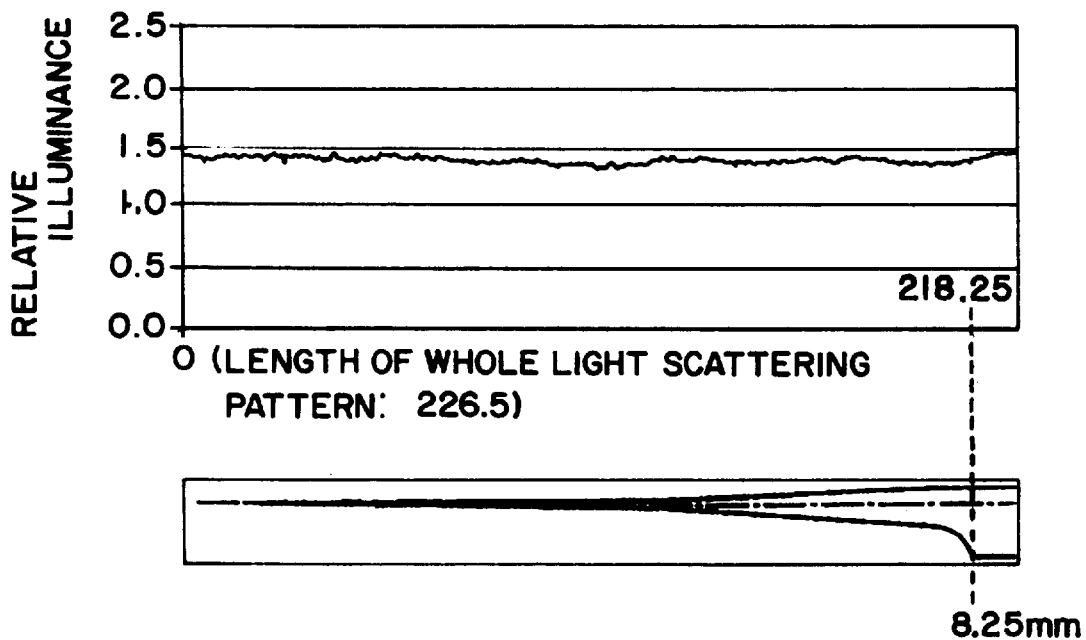
FIG. 8 shows a graph for showing a relationship between an illuminance of the light scattering pattern and a length of a third portion of the pattern in Embodiment 2.

In the case where the length of the third portion is 8.25 mm, as shown in FIG. 8, though the illuminance is increased a little bit at the last part of the third portion of the light scattering pattern, it is apparent that a uniform illuminance as a whole can be obtained.

If the length of the third portion is shortened, it can be considered that the quantity of light scattered at the other end portion comes to be small, therefore, the illuminance increases at the last part of the third portion.

And, if the length of the third portion is less than 8.25 mm, the illuminance increases at the last part of the third portion, thereby reducing the uniformity somewhat.

Embodiment 3

Conditions are as follows:

Whole length of the light scattering pattern: 226.5 mm;

Width of the third portion of the light scattering pattern: 5 mm;

Length of the third portion of the light scattering pattern: 23 mm; and

Illuminance power of incident light: 600 µW.

Evaluation

Figure 9:
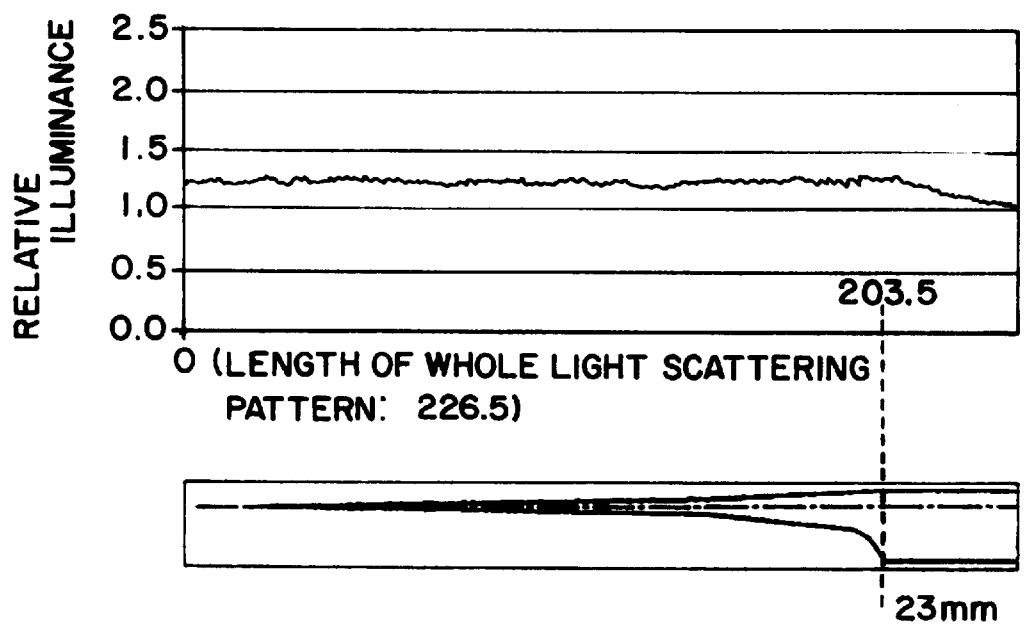
FIG. 9 shows a graph for showing a relationship between an illuminance of the light scattering pattern and a length of a third portion of the pattern in Embodiment 3.

In the case where the length of the third portion is 23 mm, as shown in FIG. 9, though the illuminance decreases somewhat at the last part of the third portion of the light scattering pattern, it is apparent that a uniform illuminance as a whole can be obtained.

However, if the length of the third portion is increased more than that cited above, the illuminance sharply decreases towards the other end, as shown in Comparison Example 1 which will be described later, and thereby it is impossible to obtain a uniform illuminance. Therefore, the length of the third portion should not be less than 23 mm.

Embodiment 4

Conditions are as follows:

Whole length of the light scattering pattern: 226.5 mm;

Width of the third portion of the light scattering pattern: 5 mm;

Length of the third portion of the light scattering pattern: 4.0 mm; and

Illuminance power of incident light: 600 $\mu$W.

Evaluation

Figure 10:
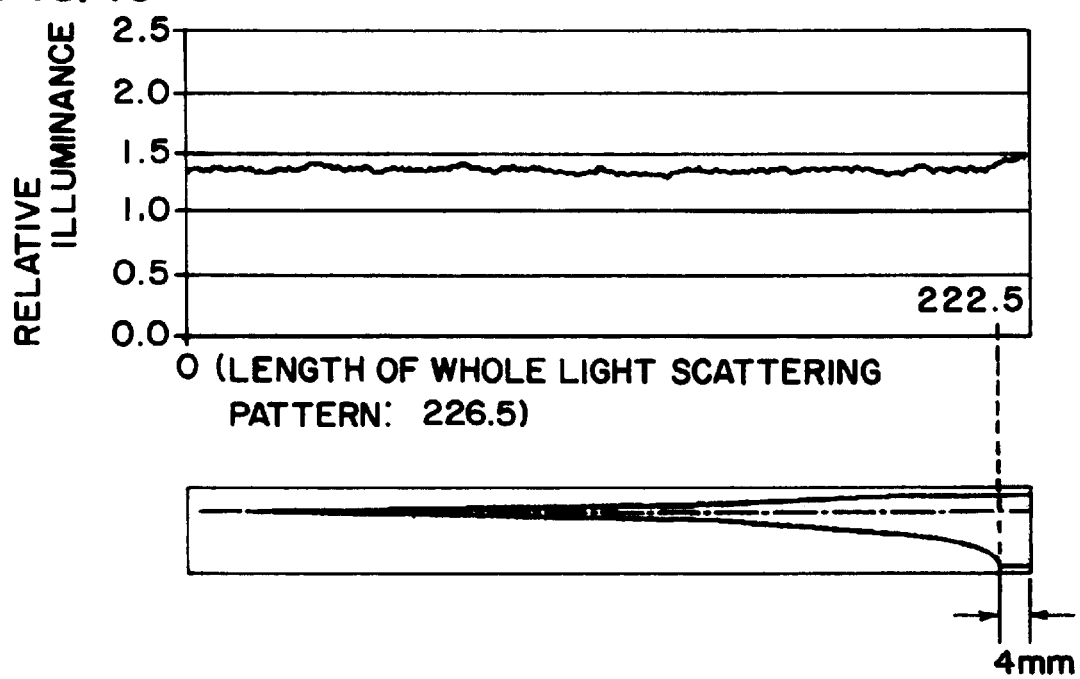
FIG. 10 shows a graph for showing a relationship between an illuminance of the light scattering pattern and a length of a third portion of the pattern in Embodiment 4.

In the case where the length of the third portion is 4.0 mm, as shown in FIG. 10, though the illuminance increases somewhat at the last part of the third portion of the light scattering pattern, it is apparent that a uniform illuminance as a whole can be obtained.

If the length of the third portion is shortened less than the figure cited above, the illuminance increases towards the other end, and it becomes impossible to obtain a uniform illuminance. Therefore, it can be said that the length of the third portion should be longer than 4.0 mm.

Comparison Example 1

Conditions are as follows:

Whole length of the light scattering pattern: 226.5 mm;

Width of the third portion of the light scattering pattern: 5 mm;

Length of the third portion of the light scattering pattern: 33 mm; and

Illuminance power of incident light: 650 $\mu$W.

Evaluation

Figure 11:
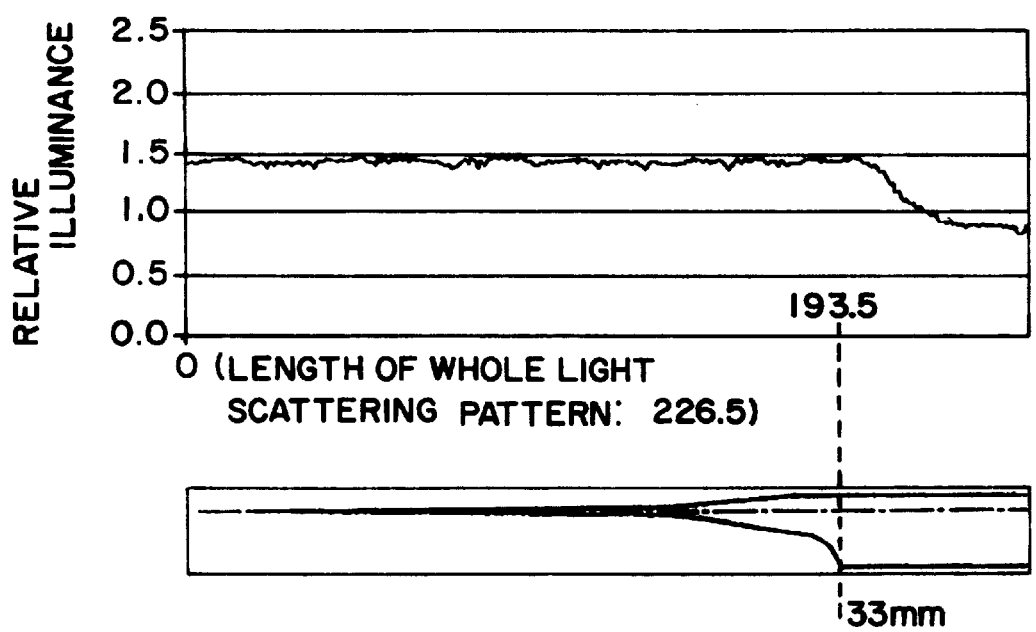
FIG. 11 shows a graph for showing a relationship between an illuminance of the light scattering pattern and a length of a second portion of the pattern in Comparison Example 1.

In the case where the length of the third portion is 33 mm, as shown in FIG. 11, the illuminance increases sharply once at the last part of the third portion of the light scattering pattern, and then it decreases sharply towards the other end, making it thereby impossible to obtain a uniform illuminance.

The reason for the increase in the illuminance at the entering part of the third portion can be considered to be that since there still remains excess incident light at this portion, then the degree of scattering is great. The reason for the sharp decrease thereafter can be considered to be that the incident light is scattered greatly at the entering part of the third portion.

Comparison Example 2

Conditions are as follows:

Whole length of the light scattering pattern: 226.5 mm;

Width of the third portion of the light scattering pattern: 1.5 mm;

Length of the third portion of the light scattering pattern: 0 mm; and

Illuminance power of incident light: 600 $\mu$W.

Evaluation

Figure 12:
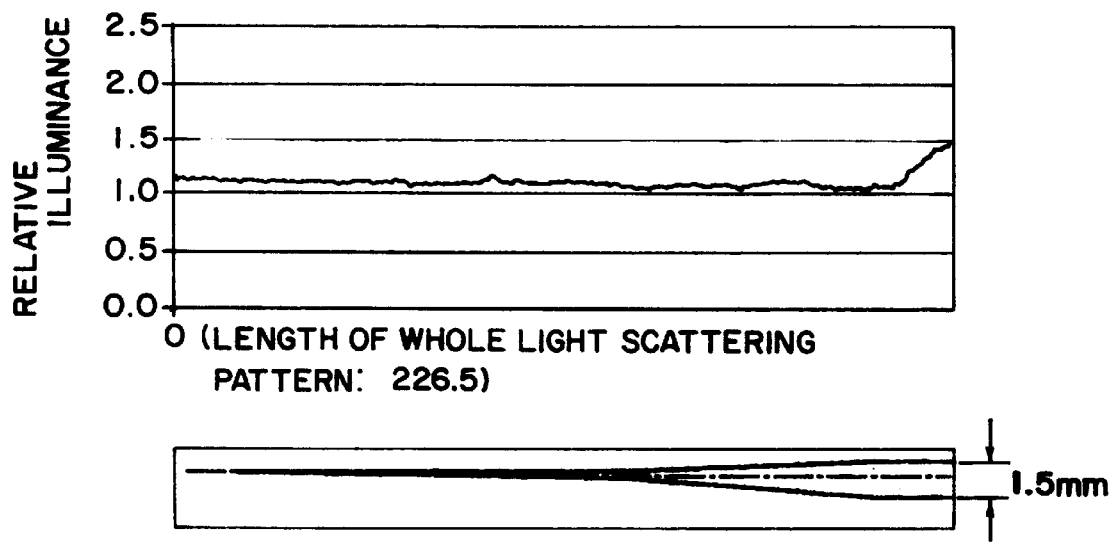
FIG. 12 shows a graph for showing a relationship between an illuminance of the light scattering pattern and a length of a third portion of the pattern in Comparison Example 2.

Substantially not forming the third portion, the second portion is extended as it is, and the width thereof is 1.5 mm. In this case, as shown in FIG. 12, the illuminance increases greatly at the other end, and it therefore becomes impossible to obtain a uniform illuminance.

From the results of the embodiments mentioned-above, assuming that the whole length of the light scattering pattern is "L", and that the length of the third portion is "A", and since $4 \leq A \leq 23$, and L=226, then it can be said that a preferable range lies within $1.77 \leq 100$ A/L$\leq 10.0$, for obtaining a uniform illuminance.

Here, the length L=226 mm is that which corresponds to the text of an A4 size or letter size document, and according to the present invention, in addition to a length of L=266 mm (for B4 size), a device having a length of L=172 (for B5 size) and of L=306 (for A3 size) are also proposed and the same beneficial results can be obtained therewith.

Next, an experimental result of a relationship between a distance, which is defined as the distance between the light emitting unit and the end surface of the light guiding member, and the illuminance is shown in the following Example 5 and Comparison Example 3.

Example 5

Conditions are as follows:

Whole length of the light scattering pattern: 172.8 mm;

Width of the third portion of the light scattering pattern: 5 mm;

Length of the third portion of the light scattering pattern: 16.5 mm;

Illuminance power of incident light: 600 $\mu$W; and

Distance (defined above): 0 mm.

Evaluation

Figure 13:
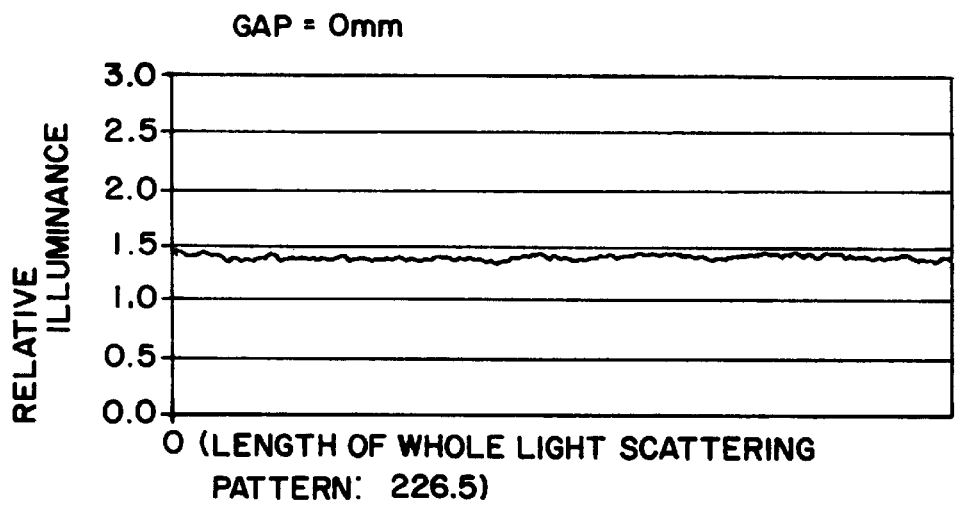
FIG. 13 shows a graph showing an illuminance when the one end of the light guiding member having the light scattering pattern according to the present invention is substantially closely attached to a light emitting unit.

In addition to satisfying the above condition, i.e., $1.77 \leq 100$ A/L$\leq 10.0$, in the case where the distance between the light emitting unit and the light guiding member is substantially 0, as shown in FIG. 13, a uniform illuminance as a whole can be obtained.

Comparison Example 3

Conditions are as follows:

Whole length of the light scattering pattern: 172.8 mm;

Width of the third portion of the light scattering pattern: 5 mm;

Length of the third portion of the light scattering pattern: 16.5 mm;

Illuminance power of incident light: 600 $\mu$W; and

Distance (defined above): 1 mm.

Evaluation

Figure 14:
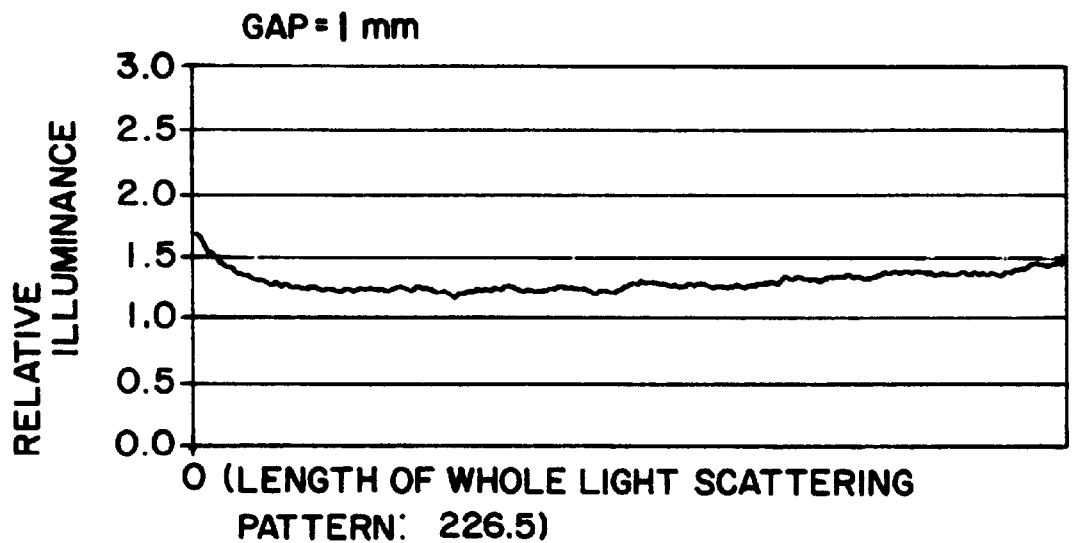
FIG. 14 shows a graph showing a relationship between an illuminance obtained by the light scattering pattern of Embodiment 5 and a length of the third portion of the pattern.

In addition to satisfying the above condition, i.e., $1.77 \leq 100$ A/L$\leq 10.0$, in the case that the distance between the light emitting unit and the light guiding member is substantially 1 mm, as shown in FIG. 14, the illuminance decreases in the vicinity of the light emitting unit, and it is apparent that a uniform illuminance cannot be obtained as a whole.

From the above-described Embodiment 5 and Comparison Example, it is preferable not to provide a clearance between the light emitting unit and the one end of the rod-like transparent light guiding member, or, at least, to make it as small as far as possible. As a concrete construction example of this, a convexo-concave engagement is conceivable.

Next, an experimental result of the illuminance when a part of the light guiding member is disposed out of the case will be shown by Embodiment 6 described below.

Embodiment 6

Conditions are as follows:

Whole length of the light scattering pattern: 172.8 mm;

Width of the third portion of the light scattering pattern: 5 mm;

Length of the third portion of the light scattering pattern: 16.5 mm; and

Illuminance power of incident light: 600 $\mu$W.

Evaluation

Figure 15:
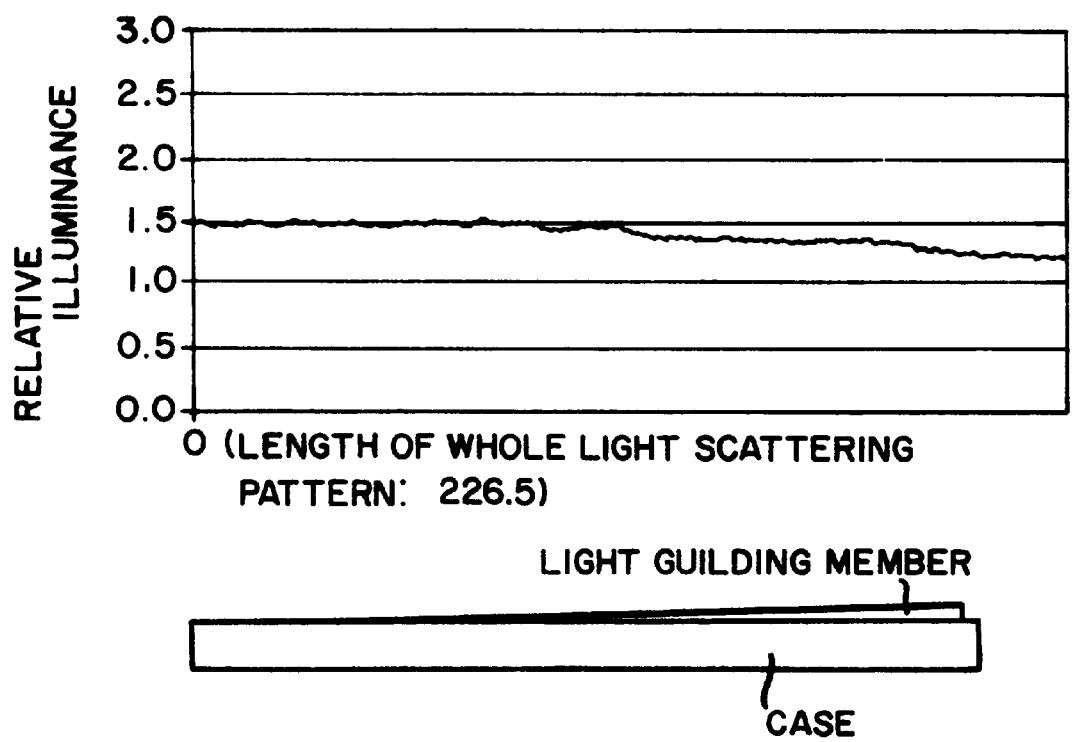
FIG. 15 shows a graph showing a relationship between an illuminance obtained by the light scattering pattern of Comparison Example 3 and a length of the third portion of the pattern.
Figure 16:
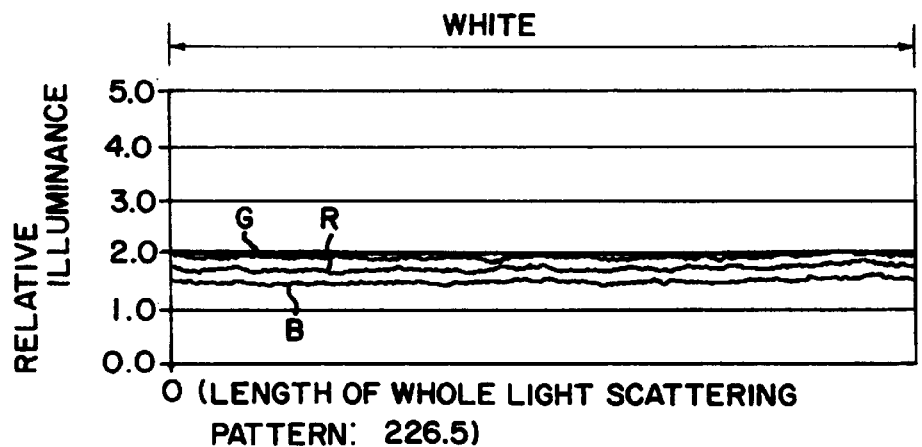
FIG. 16 shows a graph showing a relationship between an illuminance obtained by the light scattering pattern of Embodiment 6 and a length of the third portion of the pattern.
Figure 17:
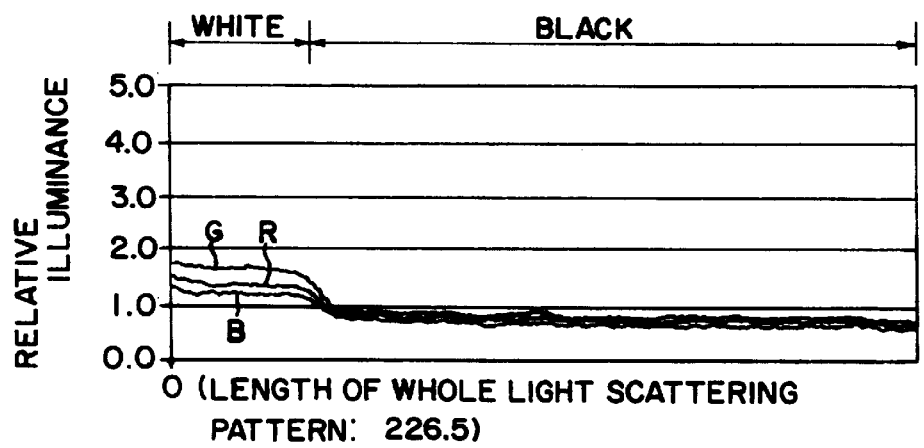
FIG. 17 shows a graph showing a relationship between an illuminance obtained by the light scattering pattern of Comparison Example 4 and a length of the third portion of the pattern.
Figure 18:
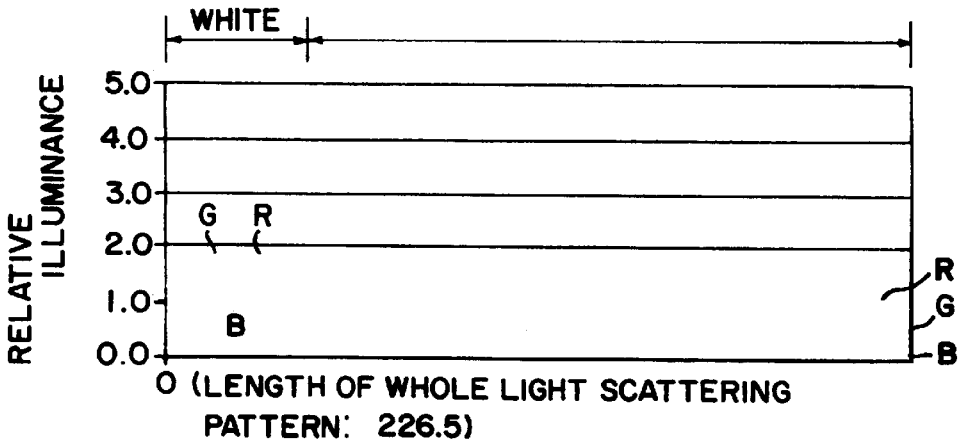
FIG. 18 shows a graph showing a relationship between an illuminance obtained by the light scattering pattern of Comparison Example 5 and a length of the third portion of the pattern.
Figure 19:
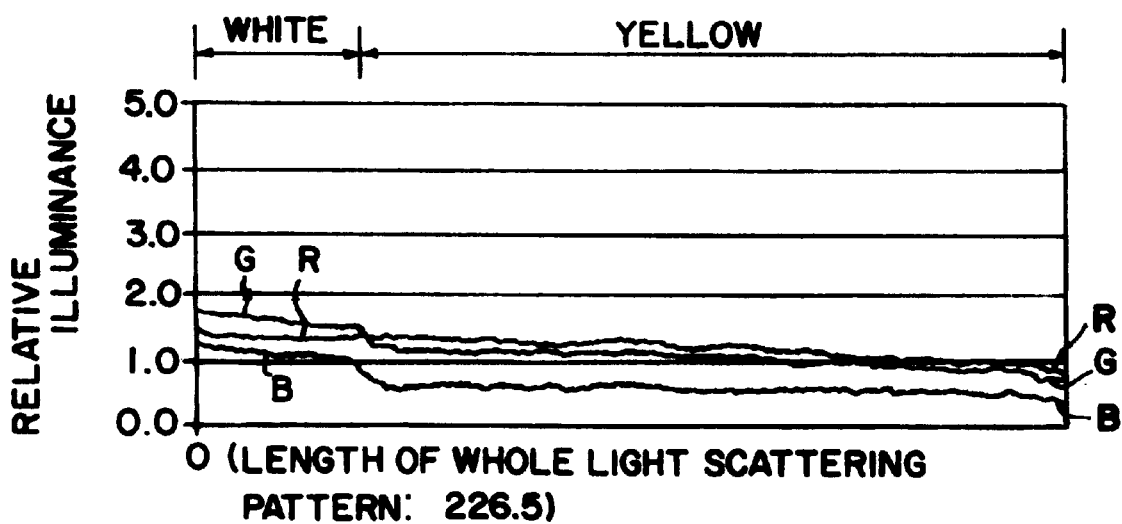
FIG. 19 shows a graph showing a relationship between an illuminance obtained by the light scattering pattern of Comparison Example 6 and a length of the third portion of the pattern.

In the case where a part of the light guiding member is disposed out of the case, as shown in FIG. 15, it is apparent that the illuminance decreases extremely at the portion which is disposed outside.

Next, an experimental results of Embodiment 7 and Comparison Examples 4 to 6 are shown, for the three primary colors, in which the whole interior surface of the case is colored white, or a portion thereof is colored white, while the remaining portion is colored black, red or yellow.

Embodiment 7

Conditions are as follows:

Whole length of the light scattering pattern: 172.8 mm;

Width of the third portion of the light scattering pattern: 5 mm;

Length of the third portion of the light scattering pattern: 16.5 mm;

Illuminance power of incident light: 600 $\mu$W; and

Whole interior surface of the case is white.

Evaluation

When the whole interior surface of the case is white, for each of the primary colors (R, G, B), a uniform illuminance as a whole can be obtained.

Comparison Example 4

Conditions are as follows:

Whole length of the light scattering pattern: 172.8 mm;

Width of the third portion of the light scattering pattern: 5 mm;

Length of the third portion of the light scattering pattern: 16.5 mm;

Illuminance power of incident light: 600 $\mu$W; and

Interior about 30 mm from the one end of the case is white, and the remaining portion is black.

Evaluation

When the color of the interior of the case is changed from white to black, the illuminance decreases extremely when it comes across a color changing point, for each of the three primary colors (R, G, B).

Comparison Example 5

Conditions are as follows:

Whole length of the light scattering pattern: 172.8 mm;

Width of the third portion of the light scattering pattern: 5 mm;

Length of the third portion of the light scattering pattern: 16.5 mm;

Illuminance power of incident light: 600 $\mu$W; and

Interior about 30 mm from the one end of the case is white, and the remaining portion is red.

Evaluation

When the color of the interior of the case is changed from white to red, though not so much for red of the three primary colors (R, G, B), the illuminance decreases extremely when it comes across a color changing point, for green and blue.

Comparison Example 6

Conditions are as follows:

Whole length of the light scattering pattern: 172.8 mm;

Width of the third portion of the light scattering pattern: 5 mm;

Length of the third portion of the light scattering pattern: 16.5 mm;

Illuminance power of incident light: 600 $\mu$W; and

Interior about 30 mm from the one end of the case is white, and the remaining portion is yellow.

Evaluation

When the color of the interior of the case is changed from white to yellow, though not so much as in the case of black, the illuminance decreases when it comes across a color changing point, for the light of the three primary colors (R, G, B).

Upon evaluating Example 7 and the Comparison Examples 4, 5 and 6 totally, the following can be said. First, when using the three primary colors (R, G, B) as the light source, in particular if the color of the interior surface of the case is a chromatic color, such as red or yellow, the uniformity of the illuminance is lost in the longitudinal direction. On the other hand, as is clear from Embodiment 7 and Comparison Example 4, the uniformity can be maintained in the case of an achromatic color. However, even with the achromatic colors, if a dark color is used, the absolute value of the illuminance decreases, and therefore, it is preferable to use a light color, especially white.

As explained in the above, in the line illumination device according to the present invention, the light source unit is provided only at the one end side of the rod-like transparent light guiding member, thereby accomplishing a reduction in the number of production processes or steps and in the production cost thereof. And, the other end surface of the rod-like transparent member is made with a rough surface (cutting surface), and therefore, a further reduction in the number of production processes or steps and in the cost can be achieved. With the light scattering pattern, since it is constructed with the first portion gradually increasing in area from the one end, opposite to which the light source unit is positioned, to the other end thereof; the second portion being continuous with the first portion and gradually increasing in area in the direction towards the other end at a higher rate than that of the first portion; and the third portion being continuous with the second portion and extending to the other end at a maximum width of the second portion, therefore, even if the other end surface is of a rough surface, most of the incident light is consumed or utilized as scattering light before reaching the rough surface.

And, with provision of an air layer between the light emitting element of the light source unit and the one end surface opposite to it of the rod-like transparent light guiding member, the angle of divergence of the incident light into the transparent light guiding member is suppressed or reduced, and it becomes difficult for the incident light to escape outside thereof, thereby achieving an effective utilization of the incident light in the transparent light guiding member.

Further, if the first portion of the above-mentioned light scattering pattern is formed with a plurality of light scanning portions which are discontinuous at least in the vicinity of the light source unit, the quantity of reflection light can be thereby controlled with an easy operation.

Moreover, in a portion very near to the one end of the light guiding member opposite to the light source unit, an area is provided in which no light scattering pattern exists, thereby making it possible to further increase the uniformity of the illuminance as a whole.

And, if the case receiving the rod-like transparent light guiding member is colored white by itself, or if the surface opposing the rod-like transparent light guiding member is colored white, even when the light leaks from a portion other than the light emitting surface of the rod-like transparent light guiding member, it is possible to return the light into the light guiding member again, by reflecting it on the interior surface of the case.

Furthermore, by attaching the case onto the rod-like transparent light guiding member with the convexo-concave engagement without using adhesive, the light will not be absorbed excessively nor go beyond the case.

What is claimed is:

1. A line illumination device having a longitudinal direction for a scanning direction and a sub-scanning direction which is perpendicular to said scanning direction and having narrow width, comprising:
    a light source unit;
    a rod-like transparent light guiding member comprising two ends having a mirror surface at one end thereof opposite to said light source unit, and a roughened surface at the other end thereof; and
    a case for receiving said rod-like transparent light guiding member therein; wherein, said rod-like transparent light guiding member has a polygonal cross section and a chamfer portion which is formed along the longitudinal direction as a light emitting surface at one corner thereof, a light scattering pattern is formed on a surface being opposite to said light emitting surface and intersecting with a normal line of said light emitting surface, a center line of said light scattering pattern in the longitudinal direction is positioned nearer to said chamfer portion than the center line of said rod-like transparent light guiding member, and said light scattering pattern has:
    a first portion gradually increasing in area thereof from said one end, opposite to which said light source unit is positioned, to the other end thereof;
    a second portion being continuous with said first portion and gradually increasing in area in the direction to the other end at a higher rate than that of said first portion; and
    a third portion being continuous to said second portion and extending to the other end at a maximum width of said second portion.

2. A line illumination device as defined in claim 1, wherein 100 A/L is equal or greater than 1.77 and is equal or less than 10.0 ($1.77 \leq 100 A/L \leq 10.0$), where L is a whole length of said light scattering pattern and A is a length of said third portion.

3. A line illumination device as defined in claim 1, wherein a layer of air is formed between a light emitting element of said light source unit and the one end of said rod-like transparent light guiding member opposite to it.

4. A line illumination device as defined in claim 1, wherein said first portion of said light scattering pattern is formed with a plurality of light scanning portions which are discontinuous at least in a vicinity of said light source unit.

5. A line illumination device as defined in claim 1, wherein a light non-scattering pattern is provided in an area in which there is provided no light scattering pattern, from the one end opposite to said light source unit to a position at which said first portion of said light scattering pattern starts from.

6. A line illumination device as defined in claim 1, wherein an interior surface of said case as a whole or an interior surface of a part which is opposite to said rod-like transparent light guiding member is colored white.

7. A line illumination device as defined in claim 1, wherein said rod-like transparent light guiding member is fixed on said case by a convexo-concave engagement for determining a position of said rod-like transparent light guiding member in the longitudinal direction thereof.

8. A line illumination device as defined in claim 1, wherein said rod-like transparent light guiding member is fixed on said case by a convexo-concave engagement for preventing said rod-like transparent light guiding member from disengaging from an opening of said case.

* * * * *